US006440249B1

(12) United States Patent
Swinburne

(10) Patent No.: US 6,440,249 B1
(45) Date of Patent: Aug. 27, 2002

(54) APPARATUS AND METHOD FOR APPLYING LABELS

(75) Inventor: Stephen Swinburne, Scarborough, ME (US)

(73) Assignee: Engineered Automation of Maine, Inc., Scarborough, ME (US)

( * ) Notice: Subject to any disclaimer, the term of this patent is extended or adjusted under 35 U.S.C. 154(b) by 15 days.

(21) Appl. No.: 09/586,374

(22) Filed: Jun. 2, 2000

Related U.S. Application Data

(60) Provisional application No. 60/137,399, filed on Jun. 3, 1999.

(51) Int. Cl.7 ........................ B32B 31/20; B32B 31/00; B65C 1/00; B65C 7/00; B65C 9/36

(52) U.S. Cl. ........................ 156/230; 156/238; 156/247; 156/289; 156/540; 156/541; 156/542; 156/584; 156/DIG. 2; 156/DIG. 23; 156/DIG. 33; 156/DIG. 37

(58) Field of Search ................................ 156/230, 238, 156/247, 289, 64, 387, 540, 541, 542, 530, 580, 584, 285, DIG. 2, DIG. 8, DIG. 18, DIG. 23, DIG. 24, DIG. 33, DIG. 37, DIG. 31

(56) References Cited

U.S. PATENT DOCUMENTS

| | | | | |
|---|---|---|---|---|
| 3,616,050 A | * 10/1971 | Schrotz | ...................... | 156/358 |
| 4,132,583 A | * 1/1979 | Hodgson | .................... | 156/351 |
| 4,189,337 A | 2/1980 | Higgins et al. | ............. | 156/351 |
| 4,210,484 A | * 7/1980 | Crankshaw et al. | ........ | 156/542 |
| 4,255,220 A | * 3/1981 | Kucheck et al. | ............ | 156/285 |
| 4,367,118 A | 1/1983 | Karp | .......................... | 156/497 |
| 4,595,447 A | 6/1986 | Lindstrom | .................. | 156/564 |
| 5,236,535 A | 8/1993 | Smith | ......................... | 156/250 |
| 5,254,189 A | * 10/1993 | Hirobe et al. | ................. | 156/64 |
| 5,300,181 A | 4/1994 | Yamaguchi | ................. | 156/542 |
| 5,304,264 A | * 4/1994 | Wehrmann | ................... | 156/64 |
| 5,370,754 A | 12/1994 | Solomon | .................... | 156/614 |
| 5,853,530 A | * 12/1998 | Allen | ......................... | 156/541 |

FOREIGN PATENT DOCUMENTS

| | | | | |
|---|---|---|---|---|
| DE | 20 08 187 A | 9/1971 | | |
| DE | 3623366 A1 * | 2/1988 | ............ | B65C/9/08 |
| EP | 0 541 378 A1 | 5/1993 | | |
| EP | 0 814 024 A | 12/1997 | | |

* cited by examiner

*Primary Examiner*—Jerry A. Lorengo
(74) *Attorney, Agent, or Firm*—Thomas L. Bohan; Patricia M. Mathers

(57) ABSTRACT

Apparatus for mechanically transferring an adhesive-backed labels to objects such as consumer items or packaging for consumer items. It receives labels on a lift-off backing strip, peeling the labels off one at a time from the strip by means of a peeler-bar. Using a pair of spring-loaded pawls attached to the outer edges of a label receiver, the apparatus mechanically engages each label along its outer edges as it begins to peel away from the strip. These pawls facilitate the peeling action as they direct the label into position in a label receiver. The label is then pressed directly onto the desired site, with no free-fall involved. In the preferred embodiment of the invention, the spring-loaded pawls push outward disengaging the label as the label receiver contacts the surface to be labeled, thus leaving the label adhered to the desired surface. In the preferred embodiment, the action of the label receiver between its label-receiving position and its label-applying position is guided by a linear slide assembly. Movement of the linear slide assembly can be provided by a pneumatic-powered piston, or by other means. When the apparatus of the present invention is incorporated into an automatic packaging system, the application of labels is coordinated with the label feed mechanism and the packaging machine by means of logic controls. In other applications, the apparatus of the present invention serves as a stand-alone labeler.

21 Claims, 7 Drawing Sheets

APPARATUS AND METHOD FOR APPLYING LABELS

CROSS-REFERENCE TO RELATED PROVISIONAL APPLICATION

This application claims the benefit of U.S. Provisional Application No. 60/137,399, filed on Jun. 3, 1999 now expired.

BACKGROUND OF THE INVENTION

1. Field of Invention

The present invention relates to apparatus used in the automated application of labels to objects. More particularly, the present invention relates to apparatus for applying adhesive-backed labels to merchandise-containing packages on an automated merchandise-encapsulating assembly line.

2. Description of Related Art

In the modem assembly-line production of products for the mass-market, an important stage is the encapsulation of the products and the labeling of the encapsulating materials. Although a good deal, and often all, of the information needed on the package (UPC, source identification, etc.) can be printed on the wrapping material itself, there often remains the need to affix other labels. These labels include in particular, but are not limited to, theft-mitigation tags and the like. Until recently, such tags were applied by the end retailer, either to the outside of the product or to the outside of the product's packaging. Lately, there has developed a demand by large retailers that these labels be already affixed when the products arrive from the manufacturer or wholesale-distributor. Furthermore, In those cases where the label is to be affixed to the product itself or even to an internal surface of the product, it is completely impracticable for the retailer to carry out this step. For these reasons and others, there is a great incentive to devise label-applicators ("labelers") operable in the rapid, automated fashion necessary to their incorporation in an assembly line.

The first label-applying devices intended to be incorporated into assembly/packaging lines reflected the diversity of label designs in use. In other words, the initial devices were designed with the hope that they could be used with most or all of the types of automated labels in common use, with the result that all these devices fall short of being ideal for any particular type of label. In addition, there are other drawbacks to the existing label-applicators, to be described below.

Labels of the type under discussion are supplied in the form of rolls of lift-off tape to which the individual labels are affixed. Conventional labeling devices for applying adhesive-backed labels use a peeler-bar to dislodge each label in turn from this lift-off tape as the item to be labeled passes through the labeling device. Once dislodged, each label is typically allowed to fall freely under the force of gravity (to go into "free-fall") until it is grabbed by the apparatus, such as a suction device, that is going to affirmatively apply the label to the item. (Alternatively, the label is deposited onto a platform from which it is then engaged by such apparatus.) In any event, the label is then held in position while it is adhering to the item to be labeled. If the label is not aligned properly at the point where pressure is applied to it and the adhering occurs, it will be affixed crookedly and/or imperfectly.

The traditional labeling devices also suffer from being complex and hence relatively prone to breakdown. Part of the complexity is due to the incorporation of a number of sub-systems, such as pneumatic-driven and gear-driven transfer mechanisms, heating elements, and more. This makes the devices more expensive at the outset and more expensive to maintain.

Solomon (U.S. Pat. No. 5,370,754; issued 1994) teaches a labeling machine that moves a label across a peeler-bar to dislodge it from its backing strip. After the label is dislodged, it free-falls until it comes to rest on a platform, from which it is picked up by a suction device and transferred to the item to be labeled. The free-fall, no matter how momentary, that occurs after the label is dislodged from the peeler-bar is a source of inaccurate label placement. The misplacement can be due to air currents, to misalignment, or to other factors. Complicated adjustments to the peeler-bar are often required to avoid this problem after the labeler equipment has been put into operation. Solomon further teaches that the transfer of the label from the detaching station to the application station is performed by a Cartesian robot having an arm with a suction function. This robot is an example of the sub-systems that can significantly add to the price of the labeling device as well as to its complexity-related breakdown rate..

Yamaguchi (U.S. Pat. No. 5,300,181; issued 1994) teaches a labeling device wherein each label is positioned by means of a suction plate prior to affixation. Although this overcomes the misplacement problems associated with free-fall, the use of a suction plate for holding the label in position introduces dependency on a vacuum-"generating" system and thus makes the device vulnerable to vacuum leaks and other failures in the pneumatic/vacuum system. Additionally, the fact that the device of Yamaguchi relies on multiple pressing in conjunction with an elastic body, introduces another possibilty of failure, that due to the elastic body.

Lindstrom (U.S. Pat. No. 4,595,447; issued 1986) discloses a labeling device that uses a vacuum foot at the end of a vertically oriented spindle that moves along a horizontal track to transfer a label from a printed-label dispenser to the article to be labeled. In addition to requiring a vacuum or other means for producing a pressure differential, such a transfer mechanism—one that translates the label in two dimensions—has many parts, thus increasing the chances of mechanical failure or faulty operation of the apparatus.

The device of Karp (U.S. Pat. No. 4,367,118; issued 1983) also uses a pressure differential to secure each label between the time it is removed from the backing strip and the time it is placed on the item to be labeled. Additionally, the suction device of Karp that transfers the label from the stripper bar to a label-transfer station. The motion of this transfer is both horizontal and vertical, and requires drive mechanisms for both directions of movement. The inclusion of these drive mechanisms adds to the cost of the label applicator and, as well, to its chances for failure during operation.

Therefore, what is needed is a labeling machine that can be integrated with a packaging machine, that avoids the alignment problems associated with "free-fall," and does not require the use of transfer drive mechanisms, nor inefficient peripheral systems such as vacuum "generators" used by existing labeling machines.

SUMMARY OF THE INVENTION

The present invention meets the goals set out above by providing labeling apparatus with relatively few mechanical parts, and no requirement of pneumatic systems to hold a label. Furthermore, the present invention provides a simplified manner of moving a strip of labels through a such an apparatus. Moreover, the present invention can be used in conjunction with semi-rigid labels (e.g., foil, paper, and anti-theft labels that incorporate circuitry) or rigid labels (e.g., anti-theft magnetic-strip-containing labels) such as are commonly used on and in the packaging of consumer products, and on the products themselves. The present invention provides a label-application device that can stand alone or be integrated into systems requiring fully automatic operation. The apparatus of the present invention mechanically removes an adhesive-backed label from a lift-off strip and places it in the position desired, typically though not necessarily on the outside of packaging. The mechanical removal of the label from the strip eliminates the inaccurate label placement associated with the label free-fall intrinsic to most existing labeling machines. The mechanical removal of the label also eliminates the possible need to apply heat to the lift-off strip to facilitate removal of the label. Additionally, this invention mechanically holds a label in position until the label is pressed directly onto a parcel. This eliminates the need for a suction device and the need for a peripheral vacuum source. Because the current invention eliminates the complicated adjustments associated with free-fall and the need for peripheral heat and vacuum sources, the current invention avoids the inefficiencies and costs associated with conventional labeling machines. The present invention can either be embodied in a stand-alone device or be integrated directly into a packaging system requiring automation from start to finish.

The heart of the present invention is the guide block assembly and label receiver. The remaining components may be located in a variety of positions as circumstances associated with a particular application dictate. In most embodiments, the various components of the invention are mounted on a back-plate. For structural integrity, the back-plate may itself be affixed to a base plate, though this is not in general necessary. Components included in the present invention are a means for mounting a label reel, fixed or rotating label stock guides, and a backing-material take-up reel. The guide block assembly consists of a guide block designed specifically for a particular type of label and a fixed design peeler bar attached to the underside of the guide block. Another important component of the present invention is a label receiver assembly consisting of a label receiver, a pawl retainer spring, and two pawls. This assembly is mounted directly or indirectly to the guide block via a linear slide. The two pawls are attached in a pivoting manner to the label receiver. A cylinder—which may be motorized—is frequently incorporated to provide movement to the label receiver assembly via the linear slide arrangement. A backing material take-up reel is mounted on a motor-driven shaft. Incorporated into this take up reel is a backing material retaining clip. A backing-material take-up motor drives the shaft.

Several components are utilized to control the motions required to remove the label from the backing material. These components can be an optical or mechanical sensing device located in the guide block in addition to a control device—such as a Programmable Logic Controller (PLC), a combination of relays, or control circuitry—specifically designed for this device.

The labels are presented to this machine attached to the backing material and subsequently rolled onto a center core. This forms a label reel that is suspended on the label reel mounting means.

Labels can be supplied to this machine via any one of several conventional methods that are well known in the art, such as by rolls of backing material (having the labels attached thereupon), or by this backing material being stacked in boxes in a so-called "fan-fold" configuration. The labels are typically adhered to a backing material which is in turn rolled up to form a label reel assembly. In order to keep the cost to a minimum, the label reel is suspended via a center core in a simple fashion that does not induce any specific amount of "drag" on the center core.

Backing material with the attached labels is threaded around label stock guides, and then between the guide block and peeler bar. The relationship of the guide block and the peeler bar is specifically designed around the label being utilized. The design of the guide block assembly, which is made up of the guide block and peeler bar, conforms closely to the cross section of the label and the backing material. The backing material is then threaded under another label stock guide and on to the backing material take up reel. Here it is attached with the backing material retaining clip.

Upon receipt of an external signal indicating that a part is in position to have a label applied to it, the control device initiates the backing material take up motor which in turn pulls the backing material through the previously described path. As the backing material travels around the peeler bar, the label travels straight, becoming increasingly unattached from the backing material. As the label becomes unattached, it enters a cavity created by the geometry of the label receiver and two movable pawls. Both the receiver and the two pawls are specifically designed for the label being utilized. The movable pawls are made of a material that the adhesive has very little, if any, tendency to adhere to. The design is also such that the lower flat surface of the label to which the adhesive has been applied contacts these pawls minimally.

Prior to the label becoming fully unattached from the backing material it has been completely captured by the label receiver assembly. At this point, depending on label design, the label may have become completely unattached from the backing material and fully traveled into the label receiver assembly. Alternately the label may have to be pushed into final position by the following label. In either situation a sensing device detects the position of the label following the label in the label receiver and sends a signal to the control device which, in turn, causes the backing material take up motor to stop. Since the stopping accuracy of this motor determines the final position of the label, the proper motor has to be specified for the application. Depending on the throughput required and accuracy of label placement required of the machine, this motor could be anything from a simple AC gear motor to a fully controllable servo motor.

After the label is in its final position in the label receiver assembly, the label receiver travels toward the final application point. This motion is caused by activation of the cylinder. Alternatively this motion could be achieved via mechanical linkage or cam(s) driven by a motor or other non pneumatic source. The first parts to contact the application surface are the two pawls. Upon contact the pawls are rotated outward against the pawl retainer spring thereby allowing the label to contact and become attached to the application surface. After label attachment, the label receiver assembly returns to the label receiving position and the cycle is repeated.

Alternately, the invention can be practiced without using pins to stop, and thus place, the label for transfer. Any of a number of mechanisms can serve to provide the accurate stop that is needed.

DETAILED DESCRIPTION OF THE PREFERRED EMBODIMENT

Figure 1:
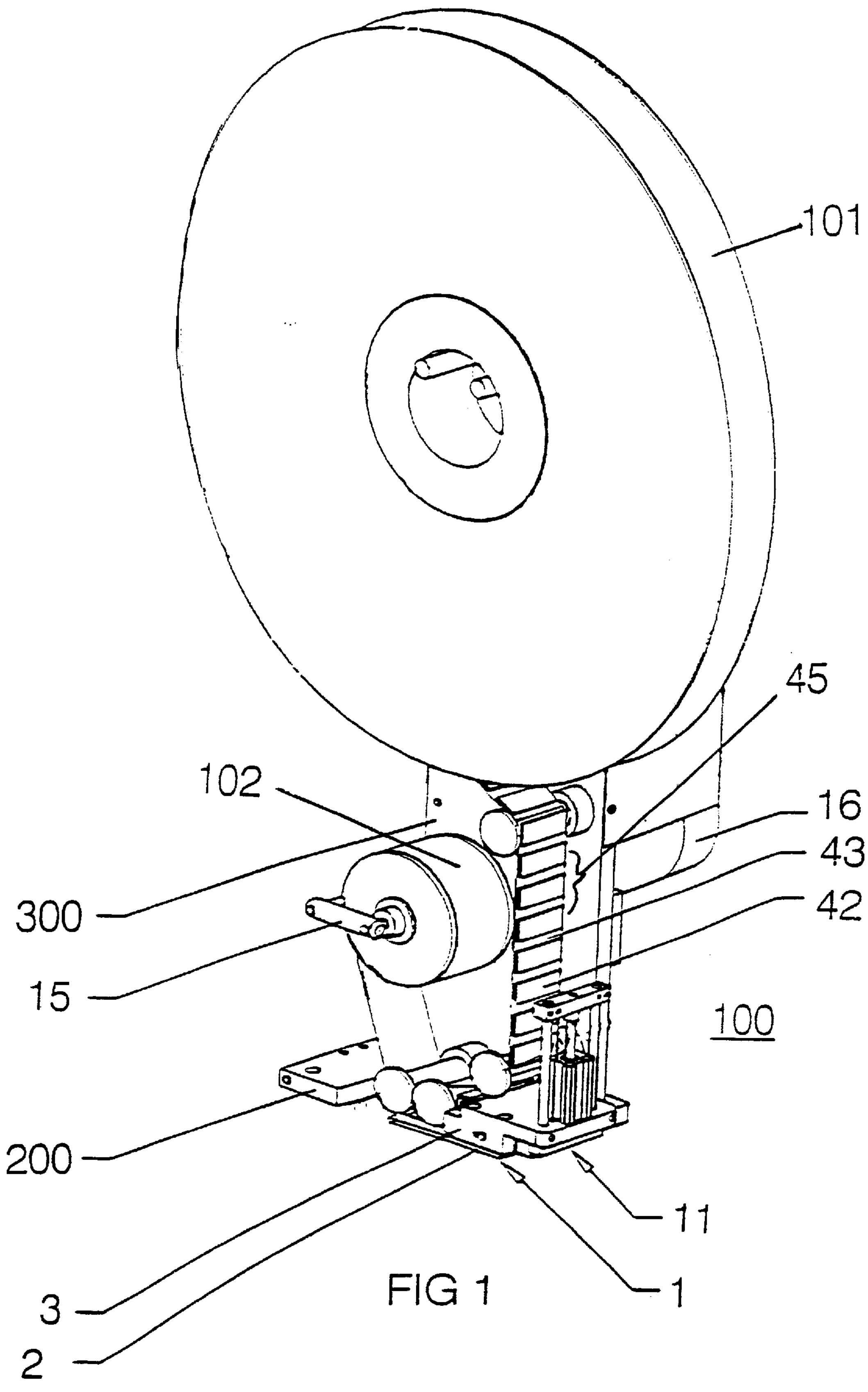
FIG. 1 is a perspective view of the Preferred Embodiment of the present invention, assembled to operate with a label reel feeding mechanism.

As depicted in FIG. 1, the labeling apparatus 100 of the Preferred Embodiment of the present invention is used with a reel-type feeding mechanism having a label-bearing-strip supply reel 101 and a backing-strip take-up reel 102 whereby a continuous label-bearing strip 45 is fed to the labeling apparatus 100 which removes an individual label 42 from the label-bearing strip 45. The labeling apparatus 100 is adapted to be integrated with an automated packaging machine. For structural integrity, the Preferred Embodiment of the invention has its components mounted on a back plate 300 affixed to a base plate 200.

Figure 2:
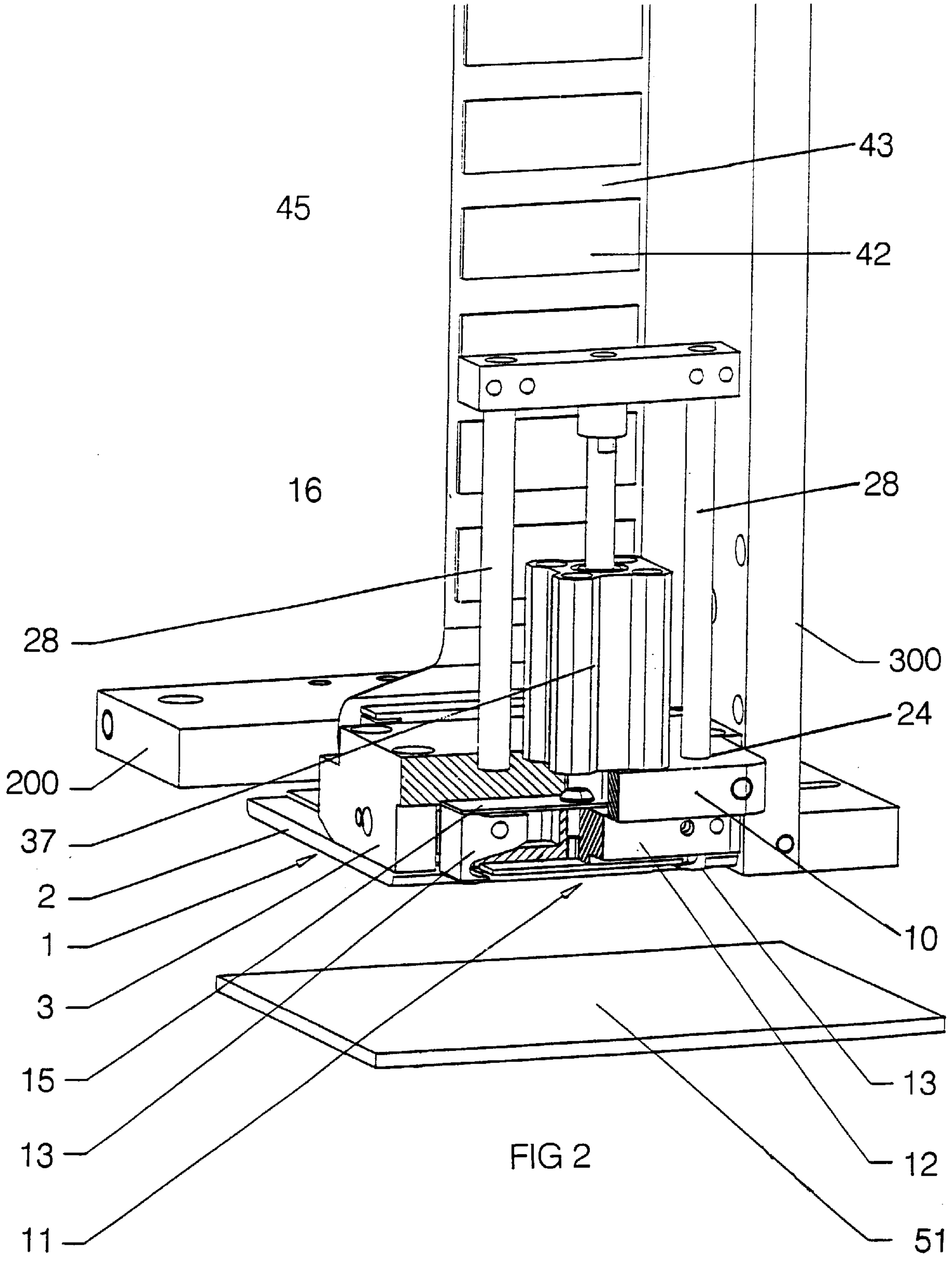
FIG. 2 is a perspective view of the Preferred Embodiment of the present invention in position for receiving a label.
Figure 3:
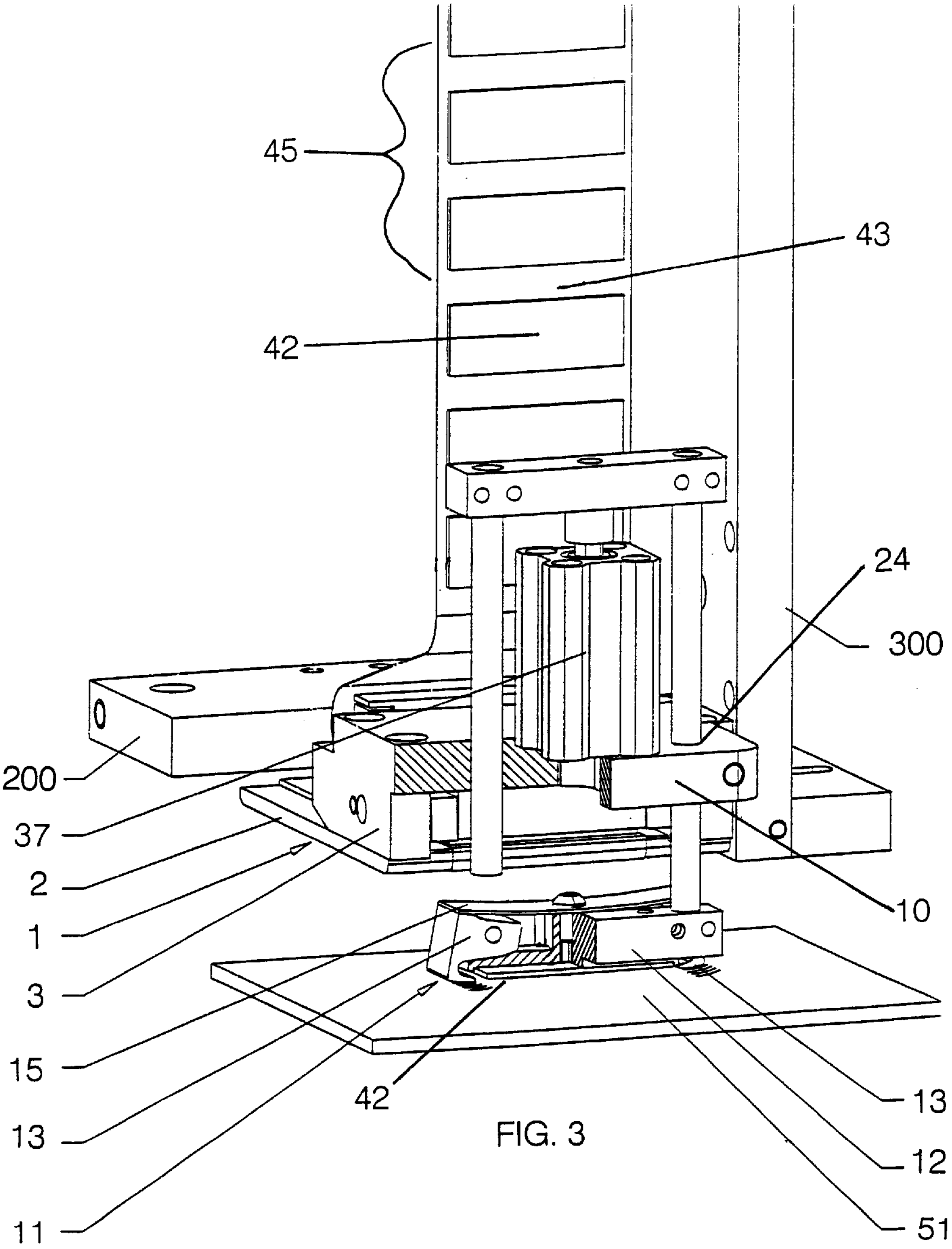
FIG. 3 is a perspective view of the Preferred Embodiment of the present invention in position for applying a label.

FIG. 2 and FIG. 3, respectively, focus on the labeling apparatus 100 in its raised label-receiving position and in its lowered label-applying position, and show its major components—a block assembly 1, a linear slide assembly 16 (consisting in part of two slide bars 28), and a label-receiver assembly 11. These three major components are illustrated in detail in FIGS. 4A–4C, FIGS. 5A–5C, and FIG. 6. It is to be borne in mind that all of the components described in this section relate to the Preferred Embodiment device of the present invention and are not intended to depict the more generalized components of the invention described in this document.

Figure 4A:
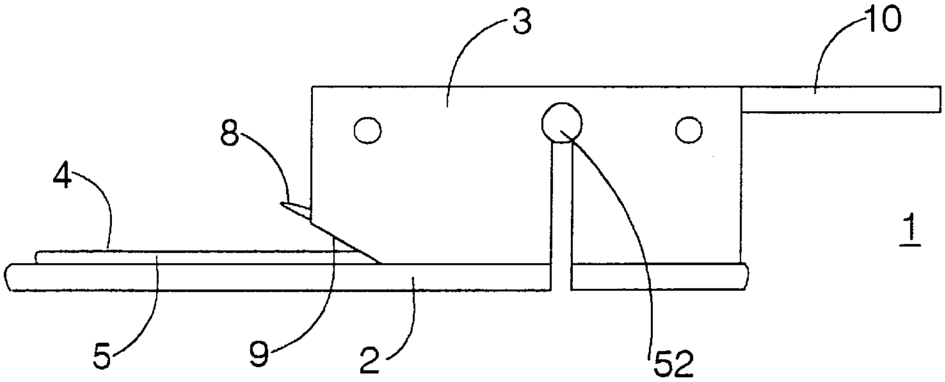
FIG. 4A is a side view of the block assembly of the Preferred Embodiment of the present invention.
Figure 4B:
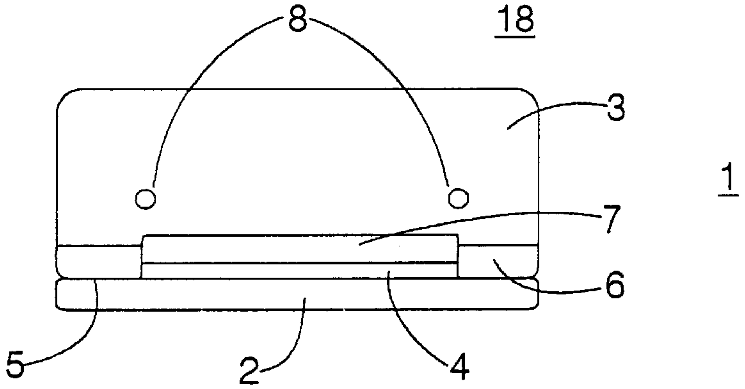
FIG. 4B is a view of the label-receiving end of the block assembly of the Preferred Embodiment of the present invention.
Figure 4C:
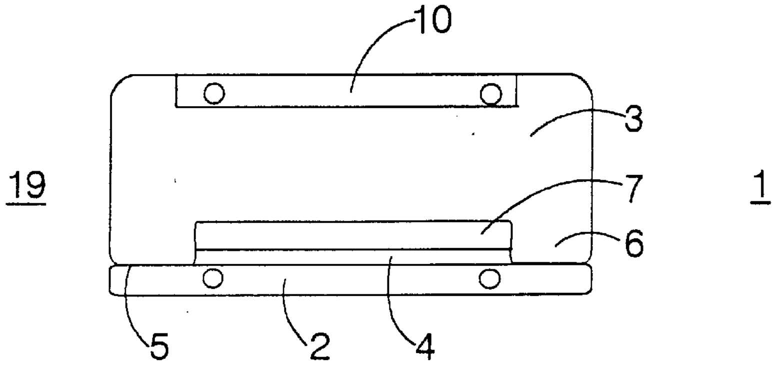
FIG. 4C is a view of the label-exit end of the block assembly of the Preferred Embodiment of the present invention.
Figure 6:
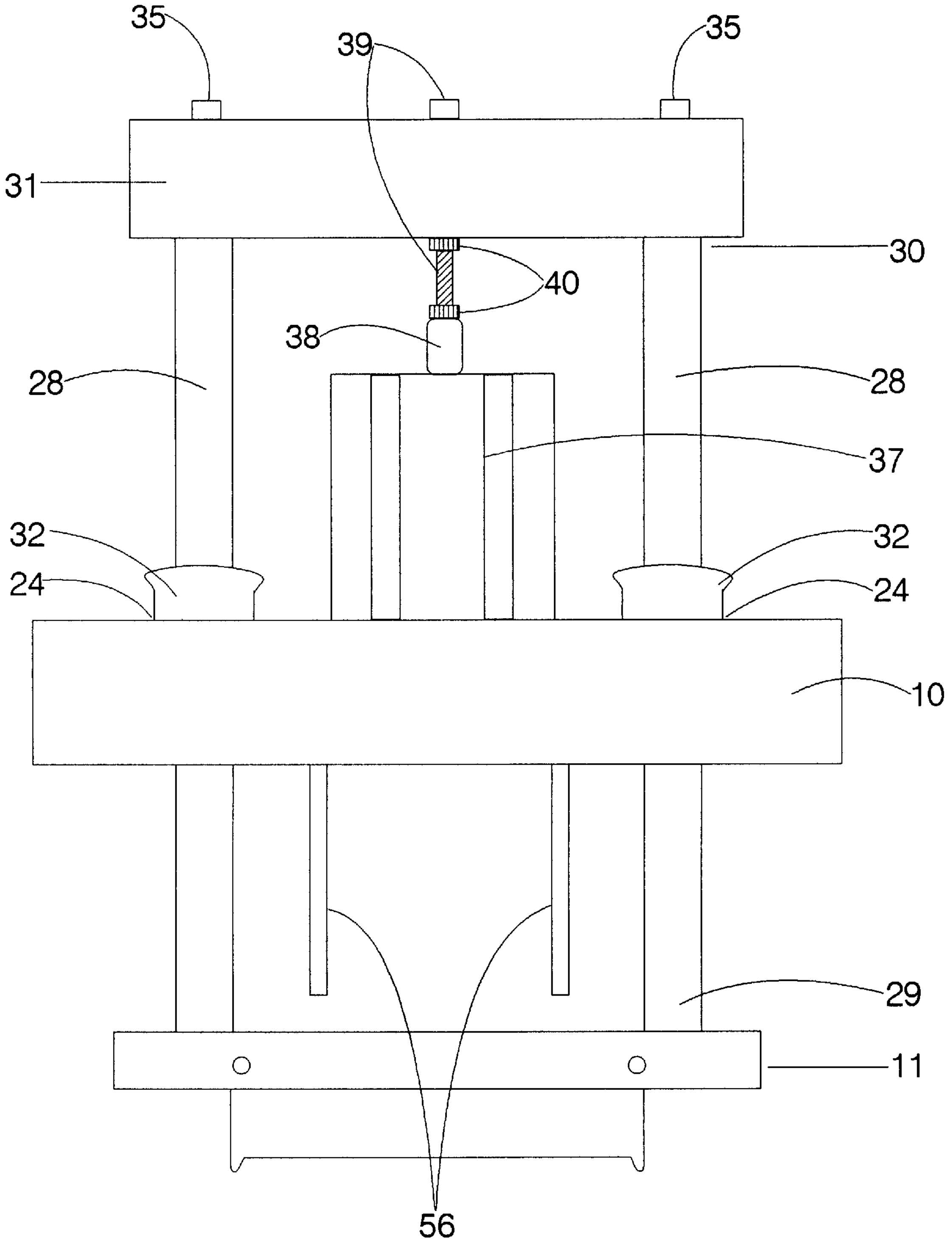
FIG. 6 is a view of the linear slide assembly as it is attached to the flange of the guide block assembly and the label receiver assembly with the label received assembly in the label-application position in the Preferred Embodiment of the present invention.

FIG. 4A through FIG. 4C show details of the block assembly 1, in particular a peeler bar 2 and guide block 3. The upper surface of the peeler bar 2 has a raised central region 4 that results in indentations 5 at the margins of the peeler bar 2. Also included in the block assembly 1 is a guide block 3. As can be seen in FIG. 4B and FIG. 4C, the lower surface of the guide block 3 has an channeled central portion that constitutes a guide slot 7 and a marginal support 6 designed to fit within the indentations 5 at the margins of the peeler bar 2 when the device is assembled. The guide slot 7 between the peeler bar 2 and the guide block 3 is continuous from the receiving end 18 of the block assembly 1 to the exit end 19 of the block assembly 1. As illustrated in FIG. 4A, the guide block 3 of the block assembly 1 has a logic sensor 52 attachable to logic-control circuitry for detecting the presence and position of the individual label 42 as the individual label 42 passes through the guide slot 7. With reference to FIG. 4B, note that the receiving end 18 of the guide block 1 contains two alignment pins 8 and a triangular recess 9—shown in profile in FIG. 4A—in the marginal support 6. The alignment pins 8 are provided for the purpose of facilitating alignment of the label-bearing strip 45 during operation of the device. As seen in FIG. 4C, the exit end 19 of the guide block 3 has a support flange 10. This support flange 10 is also shown in profile in FIG. 4A; it is for supporting the linear slide assembly 16 (see also FIG. 1 through FIG. 3). The support flange 10 has two linear-slide holes 24 to accommodate the movement of the linear slide assembly 16. Depending from the support flange 10 are two stop pins 56 that extend below the guide slot 7, as shown in FIG. 6.

FIG. 2 and FIG. 3 show the support flange 10 as it accommodates the linear slide assembly 16. The label receiver assembly 11 is attached below the support flange 10 of the guide block 3 to the bottom of the linear slide assembly 16.

Figure 5A:
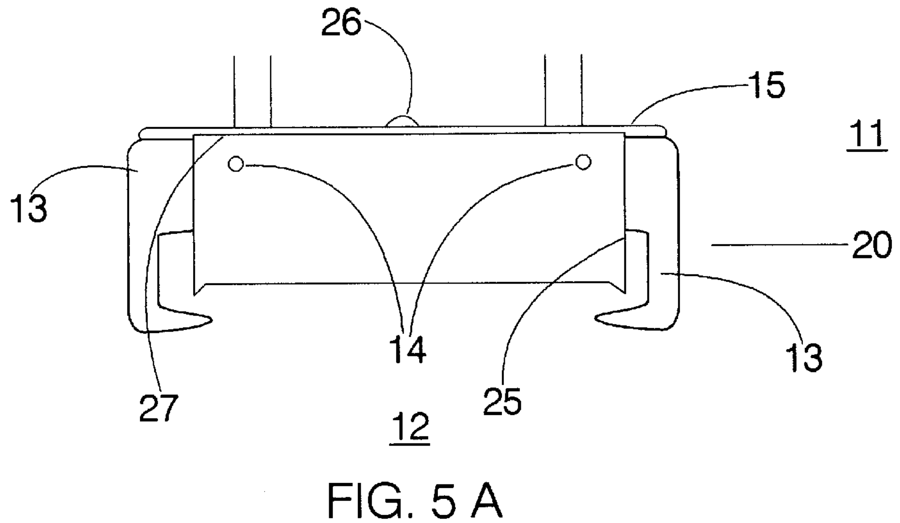
FIG. 5A is a side view of the label-receiver assembly of the Preferred Embodiment of the present invention.
Figure 5B:
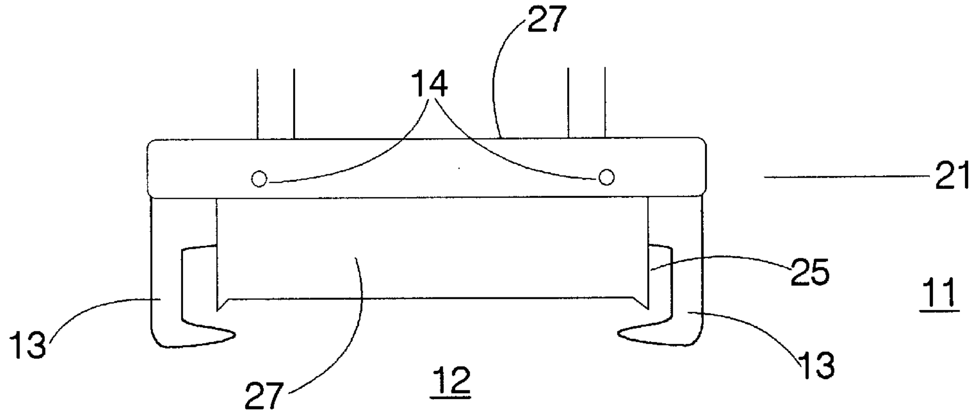
FIG. 5B is a view from the label-receiving end of the label-receiver assembly of the Preferred Embodiment of the present invention.
Figure 5C:
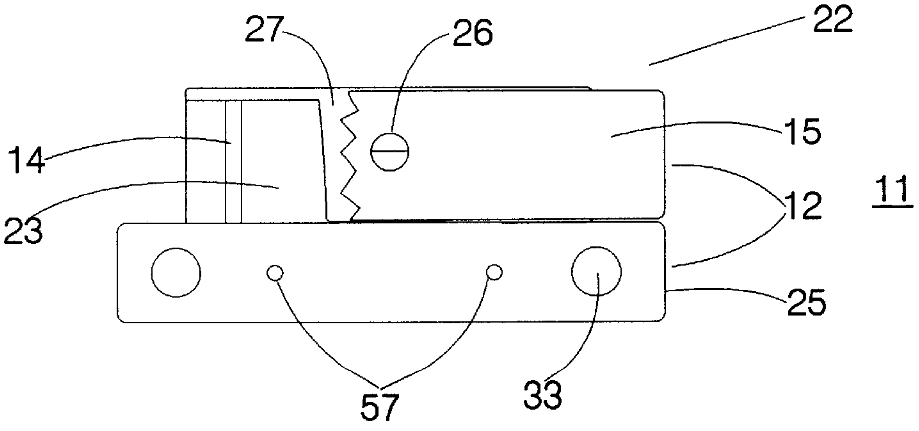
FIG. 5C is a top view of the label-receiver assembly of the Preferred Embodiment of the present invention, with a portion of the retaining spring cut away showing the pawl mounting under the spring.

FIG. 5A–FIG. 5C show, in three views, the components and parts of the label receiver assembly 11. Referring to FIG. 5A, the side view, the label receiver 12 is seen to have an assembly-mounting part 25 and a receiving part 27. The receiving part 27 forms a transverse channel in which the retaining pawls 13 are mounted. As seen in FIG. 5B, the bottom surface of the receiving part 27 is shaped to fit the upper surface of the individual label 42, which in turn has a shape corresponding to a particular type of label, that used in the Preferred Embodiment method of the present invention Two retaining pawls 13 are located at the outer sides of the receiving part 27 so as to form a cavity 27A in which to hold the individual label 42, as depicted in FIG. 2 and FIG. 3. The retaining pawls 13 are pivotably attached to the receiving part 27 within the transverse channel by two pivot pins 14. (In the Preferred Embodiment, the retaining pawls 13 are made from DELRIN®, a proprietary synthetic resinous material of E.I. duPont de Nemours that has anti-adhesive qualities; however, in general there is a wide range of materials that will satisfy the requirements imposed on the pawls: that they move freely, tend not to scratch, and tend not to be affected by the label adhesive.) The retaining pawls 13 are held in closed position for receiving a label by a retaining spring 15 that is fixed over the transverse channel of the receiving part 27 by a spring-mounting screw 26, as indicated in FIG. 5C. The pivot pins 14 are so positioned, and the bottoms of the retaining ends of the retaining pawls 13 so shaped, that, when the label receiver assembly 11 is pressed down upon a surface, the retaining pawls 13 pivot outward, away from the individual label 42, releasing it. Then, when the label receiver assembly 11 is raised, the retaining spring 15 forces the retaining pawls 13 back to their closed position for receiving another individual label 42. Taken together, FIG. 2 and FIG. 3 depict this movement of the retaining pawls 13 during operation. As shown in FIG. 5C, two slide-bar mounting holes 33 for mounting the label receiver assembly 11 to the linear slide assembly 16 are bored into the assembly-mounting part 25. Bored through the assembly-mounting part 25 are two stop-pin holes 57 for passing the stop pins 56 (see FIG. 6).

FIG. 2 shows the label receiver assembly 11 in position for receiving a label 42 from the block assembly 1. In this receiving position, the bottom of the receiving part 27 of the label receiver assembly 11 is aligned with the guide slot 7 of the block assembly 1 at its exit end (see FIG. 4) so that the retaining pawls 13 engage the label 42 as it exits guide block 3. The label-bearing strip 45 travels completely through the guide slot 7 of the block assembly 1, wraps over the end of the peeler bar 2 (as can be seen in FIG. 3), and returns beneath the peeler bar 2. As the label-bearing strip 45 wraps over the end of the peeler bar 2, the label 42 peels away from the label-bearing strip 45 and advances into the label receiver assembly 11 adhesive side down. The advancing movement of the label 42 is halted, when the label is in optimal position, by two stop pins 56 attached to the support flange 10 of the guide block 3, as may be seen in FIG. 6. When the label receiver assembly 11 is in the raised label receiving position the two stop pins 56 extend unimpeded through the two stop-pin holes 57 that extend through label receiver assembly 11.

In FIG. 3, the label receiver assembly 11 is seen in position for applying a label 42 to a package 51. In this position, the label receiver assembly 11 bearing the label 42 is pressed against the package 51 by the downward motion of the linear slide assembly 16. As the pawls 13 contact the package 51, the pawls 13 are forced outward, and the label 42 is released and pressure-applied to the package 51. The linear slide assembly 16 of this device provides for linear movement of the label receiver assembly 11 between the applying position shown in FIG. 3, and the label receiving position shown in FIG. 2.

FIG. 6 shows the linear slide assembly 16 as it is attached to the support flange 10 of the block assembly 1 and separately to the label receiver assembly 11. The pair of slide rods 28 that constitute part of the linear slide assembly 16 are attached at the top to an alignment bar 31 by attachment screws 35, and at the bottom by being press-fit into slide-bar mounting holes 33 of the assembly-mounting part 25 of the label receiver assembly 11 (see FIG. 5C). In this way the slide rods 28 are maintained mutually parallel. Between the alignment bar 31 and the label receiver assembly 11 the slide rods 28 pass through linear-slide holes 24 (see FIG. 3) in the support flange 10 of the block assembly 1. Slide bearings 32 are provided at the linear-slide holes 24 to ensure that the slide rods 28 move smoothly and unimpeded through the support flange 10.

In order to activate the sliding movement in the Preferred Embodiment, a pneumatic actuation cylinder 37 is mounted to the upper surface of the support flange 10 of the block assembly 1. The center of the actuation cylinder 37 is located underneath the center of the alignment bar 31. The actuation cylinder 37 provides linear movement to the slide assembly 16 by means of a pneumatically-actuated piston 38 extending upward from the actuation cylinder 37 and attached to the center of the alignment bar 31 by an attachment bolt 39. The attachment bolt 39 also provides two adjustment nuts 40 as a means for adjusting the distance that the linear slide assembly 16 carries the label receiver assembly 11, between the receiving position shown in FIG. 2 and the applying position shown in FIG. 3.

In sum and as illustrated in FIG. 1, the label-bearing strip 45 is fed to the block assembly 1 and passes through the guide slot 7 from the receiving end to the exit end, as described above, where the labels 42 peel away from the label-bearing strip 45 and move into the label receiver assembly 11. Thereafter the backing material 43 travels under the peeler bar 2 of the block assembly 1 and to the take-up reel 102. The take-up reel 102 is motor-driven and pulls the label-bearing strip 45 through the labeling device in synchronization with the movement of items to be labeled. Upon receipt of an external signal indicating that an item is in position to have a label 42 applied to it, the logic control of the labeling apparatus 100 triggers the pneumatic actuation cylinder 37 so as to cause the pneumatically-actuated piston 38 to drive the linear slide assembly 16 with the label-loaded label-receiver assembly 11 down onto the package 51, whereby the label 42 is applied to the package 51 as described above. Following this, the piston 38 draws the linear slide assembly upward so as to return the label receiver assembly 11 to its label-receiving position. At that point, the logic control of the labeling apparatus 100 triggers the motor-driven backing-strip take-up reel 102 which pulls the label-bearing strip 45 through the block assembly 1 until another label 42 is loaded into the label receiver assembly 11. The backing-strip take-up reel stops pulling when a signal from the logic sensor 52 of the block assembly 1 indicates the next-to-be-loaded label 42 has reached its proper position in the guide slot 7 of the block assembly 1, whereupon the labeling apparatus 100 waits for that packaging machine to signal that another package 51 is in place.

Figure 5D:
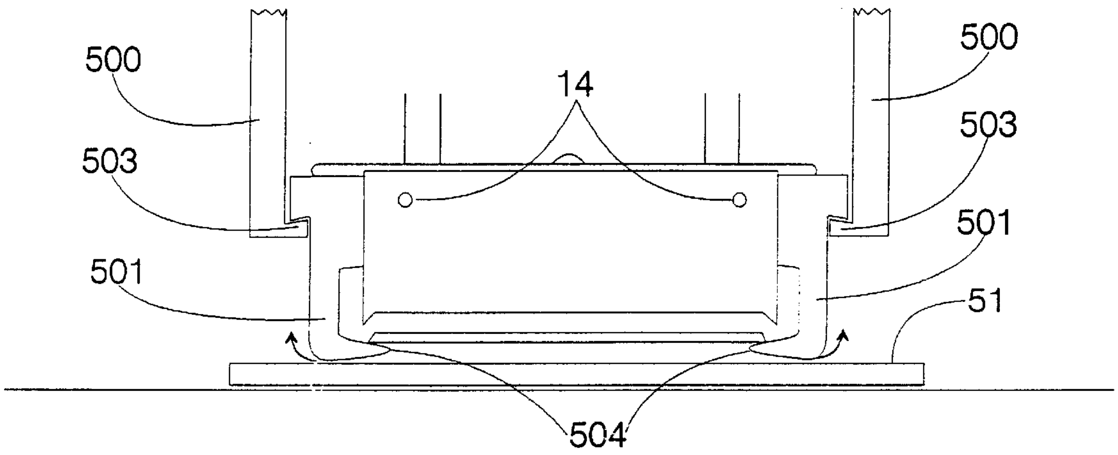
FIG. 5D shows a variant on the pawl mechanism of the Preferred Embodiment of the present invention, showing in particular a "fingered" pawl with mating trip ledges.

As a supplement to the description of the Preferred Embodiment set out above, consider FIG. 5D, which depicts a variant on the label-release mechanism, one not requiring any contact—apart from that by the label itself—between the labeling apparatus and the object to be labeled. Shown in FIG. 5D are fingered pawls 501. Each of the fingered pawls 501 has an outboard extension 503 designed to tripped by a fixed-in-position finger-tripper 503, just as the individual label 42 is in position to be affixed to the object 51. The finger-tripper in turn is mounted on the end of a vertical member 500 fixed in place somewhere above (not shown). In this manner, the individual label 42 can be mechanically conveyed right to the spot where it is applied without the necessity of any extraneous contact with the object 51. In most instances, this will not be a concern The Preferred Embodiment of the present invention has been described in considerable detail in this section, including two variations on the pawl configuration. This description has included a number of peripheral components that, though common in labeling operations, are not part of the invention itself. From the general discussion of the present invention in the Summary and elsewhere, those skilled in the art should be able to devise a number of embodiments of the invention, including some that may differ considerably from the Preferred Embodiment as set out above. These would include in particular, embodiments where the labeler apparatus and method of the present invention is used independently of any packaging apparatus and, indeed, in which the apparatus and method are applied in a stand-alone configuration. All of the various embodiments of the present invention that can be based on the general description contained herein are considered to be variants of the claimed invention.

I claim:

1. A method for automatically transferring a label from a lift-off strip of backing material to an object to be labeled, said method comprising the steps of a) arranging to feed said lift-off strip toward a label-application apparatus;

b) automatically advancing said strip by one label increment in said label-application apparatus upon arrival of said object;

c) peeling said label from said strip as said strip advances said one label increment;

d) guiding said label, adhesive-side down, into a label-conveying cavity as it is peeled from said strip, avoiding any free-fall of said label;

e) securely holding said label in said label-conveying cavity by supporting said label from beneath by a support means, expressly without applying a negative pressure to said label;

f) lowering said label-conveying cavity toward said object and releasing said label from said label-conveying cavity.

2. The method described in claim 1 further comprising a step of affirmatively pressing said label against said object after said label has been released from said label-conveying cavity.

3. Labeling apparatus for use in transferring an adhesive label from a lift-off strip onto an object to be labeled, said label having a label face and an application face, said application face being applied to said object, said apparatus comprising:

a peeler means for lifting said label off said lift-off strip, a means for conveying said label from a label lift-off position to a label-application position, a means for affixing said label onto said object, wherein said means for conveying said label includes a label-conveying cavity having a lower boundary that includes a label-support means and an upper boundary; and wherein said label is captured in said label-conveying cavity between said upper boundary and said lower boundary, with said adhesive face facing said label-support means, and is releasably held in said label-conveying cavity by said label-support means.

4. The apparatus described in claim 3 further comprising:

a receiver assembly that includes said means for lifting said label off said lift-off strip;

a guide block assembly; and a linear guide assembly that includes a receiver-assembly attachment end;

wherein said guide block includes said means for lifting said label from said lift-off strip;

wherein said receiver assembly and said linear guide assembly are cooperatively coupled so as to move said label-conveying cavity to a position for receiving said label from said peeler means and to provide said means for conveying said label from said label lift-off position to said label-application position.

5. The apparatus described in claim 4, wherein said receiver assembly includes one or more pawls that form said label-support means at said lower boundary of said label-conveying cavity, and wherein said one or more pawls guide said label into said label-conveying cavity and provide support for at least a portion of said label before said label is completely detached from said lift-off strip.

6. The apparatus described in claim 5, wherein said receiver assembly has a label-receiving end, and said means for lifting said label from said lift-off strip is a peeler bar; and wherein, when in said label-lift-off position, said label-receiving end of said receiver assembly is positioned adjacent said peeler bar so that as said label is separated from said strip by said peeler bar, said label is guided into said label-conveying cavity of said receiver assembly by said one or more pawls.

7. The apparatus described in claim 5 further comprising a label-sensing means, wherein, when said label-sensing means senses that said label has moved from said lift-off strip into said label-conveying cavity, said linear guide assembly is actuated and moves said receiver assembly toward said label-application position.

8. The apparatus described in claim 5, wherein said label-release means includes an actuating mechanism that is connected to said one or more pawls such that when said receiver assembly has been conveyed to said label-application position said actuating mechanism causes said one or more pawls to move away from said lower boundary of said label-conveying cavity, thereby releasing said label from said cavity.

9. The apparatus described in claim 8, wherein said actuating mechanism is a pivot mechanism that connects said one or more pawls to said receiver assembly and wherein said one or more pawls are adapted to deflect outward and away from said lower boundary when said receiver assembly is forced against said object.

10. The apparatus described in claim 8 wherein each one of said one or more pawls has an outboard finger and said actuating mechanism includes a finger-tripper that is actuatably connectable to said outboard finger, wherein said outboard finger is trippable by said finger-tripper as said receiver assembly moves toward said label-application position, and wherein tripping said outboard finger causes each respective one of said one or more pawls to deflect away from said lower boundary.

11. A labeling apparatus for automatically transferring a label from a strip of labels, said label having a label face and an application face that is adhesively fixable to an object, said apparatus comprising a guide block assembly having a strip-receiving end, a strip-exit end, a guide slot for guiding said strip from said strip-receiving end to said strip-exit end, and a label-peeling means for peeling said label from said strip, said label-peeling means extending from said guide block so as to peel said label from said strip as said strip exits said guide block;

a label receiver having a label-conveying cavity with an upper surface and a lower surface, wherein said lower surface is aligned with said strip-exit end of said guide block assembly so as to receive said label from said guide slot, wherein said lower surface provides a label-support means for said label, and wherein said label is releasably held in said label-conveying cavity with said application face against said label-support means;

a linear slide mounted on said guide block assembly and having a lower end coupled with said label receiver, said linear slide having a first position at which said label is captured by said label receiver and a second position at which said label is released from said label-conveying cavity; and an actuatable drive means wherein said drive means is attached to said linear slide so as to alternatively drive said label receiver between said first position and said second position.

12. The apparatus of claim 11, wherein said drive means is a piston and cylinder mechanism, said piston having a first end and a second end, wherein said first end is attached to said linear slide and said second end slidably coupled to cylinder.

13. The apparatus of claim 12 wherein said pneumatic force is provided as a drive force.

14. The apparatus of claim 12 wherein said drive means is a drive shaft and an electric motor and said drive shaft is connected to said linear guide.

15. The apparatus of claim 11, wherein said label-support means includes two pawls, each of said pawls depending from said label-receiver so as to support said label from below in said label-conveying cavity.

16. The apparatus of claim 5, wherein said label-conveying cavity is positioned closely adjacent to said lift-off means so as to receive said label as it peels from said lift-off strip, before said label is completely detached from said lift-off strip.

17. The apparatus of claim 9, wherein, when said one or more pawls are forced to deflect outward and away from said lower boundary, said upper boundary of said cavity presses said label against said object.

18. Labeling apparatus for use in transferring an adhesive label from a lift-off strip onto an object to be labeled, said label having a label face and an application face, said application face being applied to said object, said apparatus consisting essentially of:

a receiver assembly that includes a means for conveying said label from a capture position to an application position;

a guide block assembly that includes a means for lifting said label from said lift-off strip; and a linear guide assembly that includes a receiver-assembly attachment end;

wherein said receiver assembly is connected to said linear guide assembly at said receiver-assembly attachment end and is conveyable from said capture position to said label-application position;

wherein said means for conveying said label includes a label-conveying cavity having a lower boundary that includes a label-support means and an upper boundary; and wherein said label is captured in said label-conveying cavity between said upper boundary and said lower boundary, with said adhesive face facing said label-support means, and is releasably held in said label-conveying cavity by said label-support means.

19. The apparatus described in claim 18, wherein said receiver assembly includes one or more pawls that form said label-support means at said lower boundary of said label-conveying cavity, and wherein said one or more pawls guide said label into said label-conveying cavity and provide support for at least a portion of said label before said label is completely detached from said lift-off strip.

20. The apparatus described in claim 19, wherein said receiver assembly has a label-receiving end, and said means for lifting said label from said lift-off strip is a peeler bar; and wherein, when in said label-lift-off position, said label-receiving end of said receiver assembly is positioned adjacent said peeler bar so that as said label is separated from said strip by said peeler bar, said label is guided into said label-conveying cavity of said receiver assembly by said one or more pawls;

wherein said label-release means includes an actuating mechanism that is connected to said one or more pawls such that when said receiver assembly has been conveyed to said label-application position said actuating mechanism causes said one or more pawls to move away from said lower boundary of said label-conveying cavity, thereby releasing said label from said cavity.

21. The apparatus described in claim 20, wherein said actuating mechanism is a pivot mechanism that connects said one or more pawls to said receiver assembly and wherein said one or more pawls are adapted to deflect outward and away from said lower boundary when said receiver assembly is forced against said object.

* * * * *